US009905020B2

(12) United States Patent
Cheng et al.

(10) Patent No.: US 9,905,020 B2
(45) Date of Patent: Feb. 27, 2018

(54) METHOD AND CIRCUITRY FOR PERFORMING CENSUS TRANSFORMS

(71) Applicant: Texas Instruments Incorporated, Dallas, TX (US)

(72) Inventors: Victor Cheng, Fort Lauderdale, FL (US); Darnell Janssen Moore, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 39 days.

(21) Appl. No.: 15/041,933

(22) Filed: Feb. 11, 2016

(65) Prior Publication Data

US 2016/0239948 A1 Aug. 18, 2016

Related U.S. Application Data

(60) Provisional application No. 62/115,211, filed on Feb. 12, 2015.

(51) Int. Cl.
*G06K 9/00* (2006.01)
*G06T 7/37* (2017.01)
(52) U.S. Cl.
CPC ..................... *G06T 7/37* (2017.01)
(58) Field of Classification Search
CPC . G06T 7/593; G06T 7/73; G06T 2207/10012; H04N 2013/0081
See application file for complete search history.

(56) References Cited

U.S. PATENT DOCUMENTS

| 6,215,898 | B1* | 4/2001 | Woodfill | G06K 9/32 |
| | | | | 348/47 |
| 2009/0245586 | A1* | 10/2009 | Jeon | G06T 7/262 |
| | | | | 382/107 |
| 2012/0163704 | A1* | 6/2012 | Chang | G06T 7/0022 |
| | | | | 382/154 |
| 2014/0002605 | A1* | 1/2014 | Liao | G06T 5/005 |
| | | | | 348/46 |
| 2014/0003704 | A1* | 1/2014 | Liao | G06T 7/0075 |
| | | | | 382/154 |
| 2015/0193663 | A1* | 7/2015 | Oh | G06K 9/00818 |
| | | | | 382/104 |
| 2016/0048970 | A1* | 2/2016 | Loghman | G06T 7/593 |
| | | | | 382/154 |
| 2016/0142736 | A1* | 5/2016 | Zhou | H04N 19/61 |
| | | | | 375/240.18 |

(Continued)

OTHER PUBLICATIONS

Baik et al., "Fast Census Transform-based Stereo Algorithm Using SSE2", Feb. 2-3, 2006. The 12$^{th}$ Korea-Japan Joint Workshop on Frontiers of Computer Vision.*

*Primary Examiner* — Aaron W Carter
(74) *Attorney, Agent, or Firm* — Gregory J. Albin; Charles A. Brill; Frank D. Cimino

(57) ABSTRACT

Methods of stitching data generated by a plurality of census transforms are disclosed. The methods include performing a plurality of census transforms on an array of pixels in a first direction. First and second code words of the census transform results are stored in arrays. The arrays are transposed and interleaved. The first and second code words are stitched by reading a vertical column of the array of interleaved code words.

18 Claims, 12 Drawing Sheets

(56) References Cited

U.S. PATENT DOCUMENTS

2016/0173852 A1\* 6/2016 Moon ..................... G06T 7/593
                                                    348/43
2016/0239948 A1\* 8/2016 Cheng ...................... G06T 7/37
2016/0364875 A1\* 12/2016 Seki ........................ G06K 9/56

\* cited by examiner

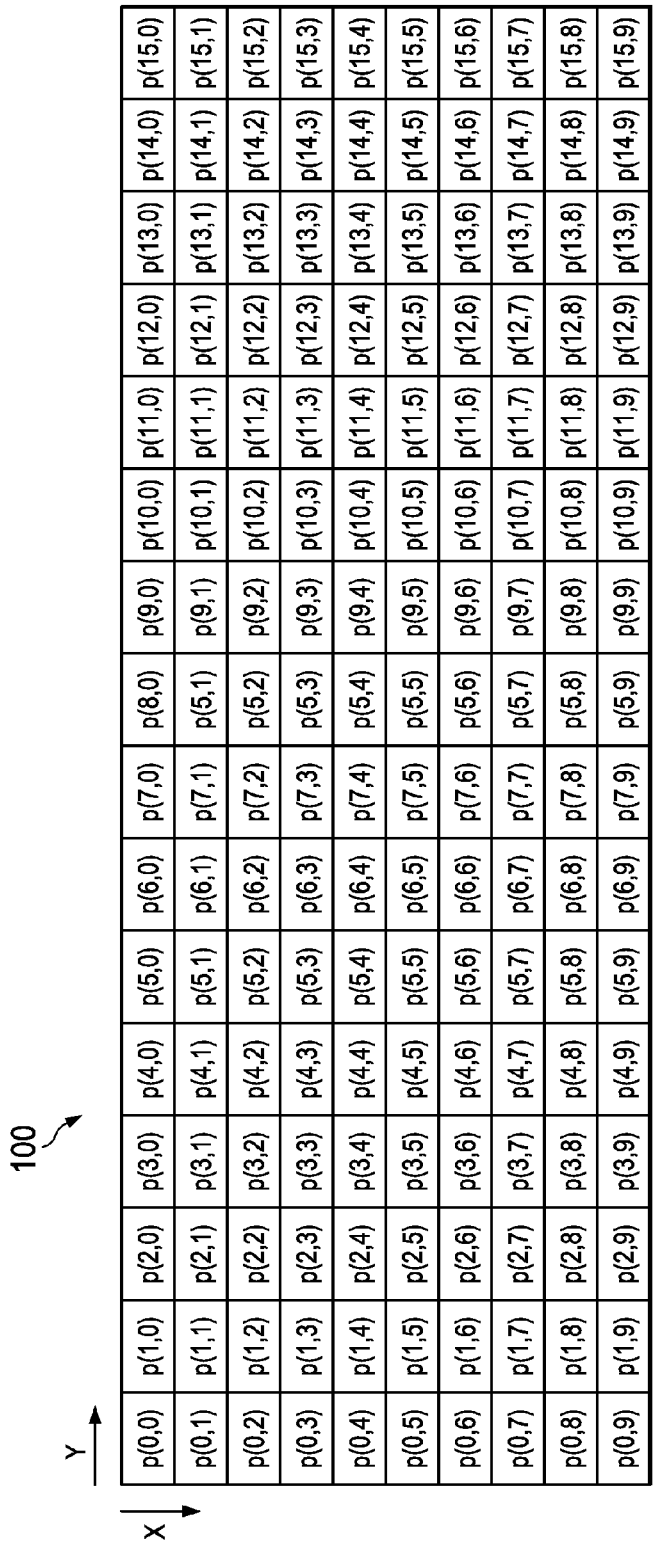

| $A(x,y)=p(x,y) \geq p(x-1,y-1)$ | $B(x,y)=p(x,y) \geq p(x,y-1)$ | $C(x,y)=p(x,y) \geq p(x+1,y-1)$ |
|---|---|---|
| $D(x,y)=p(x,y) \geq p(x-1,y)$ | $E(x,y)=p(x,y) \geq p(x,y)=1$ | $F(x,y)=p(x,y) \geq p(x+1,y)$ |
| $G(x,y)=p(x,y+1) \geq p(x-1,y+1)$ | $H(x,y)=p(x,y) \geq p(x,y+1)$ | $I(x,y)=p(x,y) \geq p(x+1,y+1)$ |

| L_A(0,0) | L_A(1,0) | L_A(2,0) | L_A(3,0) | L_A(4,0) | L_A(5,0) | L_A(6,0) | L_A(7,0) | L_A(8,0) | ∘∘∘ |
| L_A(0,1) | L_A(1,1) | L_A(2,1) | L_A(3,1) | L_A(4,1) | L_A(5,1) | L_A(6,1) | L_A(7,1) | L_A(8,1) | ∘∘∘ |
| L_A(0,2) | L_A(1,2) | L_A(2,2) | L_A(3,2) | L_A(4,2) | L_A(5,2) | L_A(6,2) | L_A(7,2) | L_A(8,2) | ∘∘∘ |
| L_A(0,3) | L_A(1,3) | L_A(2,3) | L_A(3,3) | L_A(4,3) | L_A(5,3) | L_A(6,3) | L_A(7,3) | L_A(8,3) | ∘∘∘ |
| L_A(0,4) | L_A(1,4) | L_A(2,4) | L_A(3,4) | L_A(4,4) | L_A(5,4) | L_A(6,4) | L_A(7,4) | L_A(8,4) | ∘∘∘ |
| L_A(0,5) | L_A(1,5) | L_A(2,5) | L_A(3,5) | L_A(4,5) | L_A(5,5) | L_A(6,5) | L_A(7,5) | L_A(8,5) | ∘∘∘ |
| L_A(0,6) | L_A(1,6) | L_A(2,6) | L_A(3,6) | L_A(4,6) | L_A(5,6) | L_A(6,6) | L_A(7,6) | L_A(8,6) | ∘∘∘ |
| L_A(0,7) | L_A(1,7) | L_A(2,7) | L_A(3,7) | L_A(4,7) | L_A(5,7) | L_A(6,7) | L_A(7,7) | L_A(8,7) | ∘∘∘ |
| L_A(0,8) | L_A(1,8) | L_A(2,8) | L_A(3,8) | L_A(4,8) | L_A(5,8) | L_A(6,8) | L_A(7,8) | L_A(8,8) | ∘∘∘ |
| L_A(0,9) | L_A(1,9) | L_A(2,9) | L_A(3,9) | L_A(4,9) | L_A(5,9) | L_A(6,9) | L_A(7,9) | L_A(8,9) | ∘∘∘ |
| ∘∘∘ | ∘∘∘ | ∘∘∘ | ∘∘∘ | ∘∘∘ | ∘∘∘ | ∘∘∘ | ∘∘∘ | ∘∘∘ | ∘∘∘ |

| A(x,y) | B(x,y) | C(x,y) |
| --- | --- | --- |
| D(x,y) | E(x,y) | F(x,y) |
| G(x,y) | H(x,y) | I(x,y) |

| A(x+1,y) | B(x+1,y) | C(x+1,y) |
| --- | --- | --- |
| D(x+1,y) | E(x+1,y) | F(x+1,y) |
| G(x+1,y) | H(x+1,y) | I(x+1,y) |

○
○

| A(x+7,y) | B(x+7,y) | C(x+7,y) |
| --- | --- | --- |
| D(x+7,y) | E(x+7,y) | F(x+7,y) |
| G(x+7,y) | H(x+7,y) | I(x+7,y) |

| A(x,y)...A(x+7,y) | B(x,y)...B(x+7,y) | C(x,y)...C(x+7,y) |
| --- | --- | --- |
| D(x,y)...D(x+7,y) | E(x,y)...E(x+7,y) | F(x,y)...F(x+7,y) |
| G(x,y)...G(x+7,y) | H(x,y)...H(x+7,y) | I(x,y)...I(x+7,y) |

|      | BIT #7   | BIT #6   | BIT #5   | BIT #4   | BIT #3   | BIT #2   | BIT #1   | BIT #0 |
|------|----------|----------|----------|----------|----------|----------|----------|--------|
| V[0] | A(x+7,y) | A(x+6,y) | A(x+5,y) | A(x+4,y) | A(x+3,y) | A(x+2,y) | A(x+1,y) | A(x,y) |
| V[1] | B(x+7,y) | B(x+6,y) | B(x+5,y) | B(x+4,y) | B(x+3,y) | B(x+2,y) | B(x+1,y) | B(x,y) |
| V[2] | C(x+7,y) | C(x+6,y) | C(x+5,y) | C(x+4,y) | C(x+3,y) | C(x+2,y) | C(x+1,y) | C(x,y) |
| V[3] | D(x+7,y) | D(x+6,y) | D(x+5,y) | D(x+4,y) | D(x+3,y) | D(x+2,y) | D(x+1,y) | D(x,y) |
| V[4] | E(x+7,y) | E(x+6,y) | E(x+5,y) | E(x+4,y) | E(x+3,y) | E(x+2,y) | E(x+1,y) | E(x,y) |
| V[5] | F(x+7,y) | F(x+6,y) | F(x+5,y) | F(x+4,y) | F(x+3,y) | F(x+2,y) | F(x+1,y) | F(x,y) |
| V[6] | G(x+7,y) | G(x+6,y) | G(x+5,y) | G(x+4,y) | G(x+3,y) | G(x+2,y) | G(x+1,y) | G(x,y) |
| V[7] | H(x+7,y) | H(x+6,y) | H(x+5,y) | H(x+4,y) | H(x+3,y) | H(x+2,y) | H(x+1,y) | H(x,y) |

|      | BIT #7   | BIT #6   | BIT #5   | BIT #4   | BIT #3   | BIT #2   | BIT #1   | BIT #0   |
|------|----------|----------|----------|----------|----------|----------|----------|----------|
| V[0] | H(x,y)   | G(x,y)   | F(x,y)   | E(x,y)   | D(x,y)   | C(x,y)   | B(x,y)   | A(x,y)   |
| V[1] | H(x+1,y) | G(x+1,y) | F(x+1,y) | E(x+1,y) | D(x+1,y) | C(x+1,y) | B(x+1,y) | A(x+1,y) |
| V[2] | H(x+2,y) | G(x+2,y) | F(x+2,y) | E(x+2,y) | D(x+2,y) | C(x+2,y) | B(x+2,y) | A(x+2,y) |
| V[3] | H(x+3,y) | G(x+3,y) | F(x+3,y) | E(x+3,y) | D(x+3,y) | C(x+3,y) | B(x+3,y) | A(x+3,y) |
| V[4] | H(x+4,y) | G(x+4,y) | F(x+4,y) | E(x+4,y) | D(x+4,y) | C(x+4,y) | B(x+4,y) | A(x+4,y) |
| V[5] | H(x+5,y) | G(x+5,y) | F(x+5,y) | E(x+5,y) | D(x+5,y) | C(x+5,y) | B(x+5,y) | A(x+5,y) |
| V[6] | H(x+6,y) | G(x+6,y) | F(x+6,y) | E(x+6,y) | D(x+6,y) | C(x+6,y) | B(x+6,y) | A(x+6,y) |
| V[7] | H(x+7,y) | G(x+7,y) | F(x+7,y) | E(x+7,y) | D(x+7,y) | C(x+7,y) | B(x+7,y) | A(x+7,y) |

| | BIT #7 | BIT #6 | BIT #5 | BIT #4 | BIT #3 | BIT #2 | BIT #1 | BIT #0 |
|---|---|---|---|---|---|---|---|---|
| V[0] | | | | ZERO_PADD | | | | I(x,y) |
| V[1] | | | | ZERO_PADD | | | | I(x+1,y) |
| V[2] | | | | ZERO_PADD | | | | I(x+2,y) |
| V[3] | | | | ZERO_PADD | | | | I(x+3,y) |
| V[4] | | | | ZERO_PADD | | | | I(x+4,y) |
| V[5] | | | | ZERO_PADD | | | | I(x+5,y) |
| V[6] | | | | ZERO_PADD | | | | I(x+6,y) |
| V[7] | | | | ZERO_PADD | | | | I(x+7,y) |

FIG. 9E

| | | | |
|---|---|---|---|
| H(0,0)...B(0,0)A(0,0)...H(0,7)...B(0,7)A(0,7) | ∘∘∘ | H(0,H-8)...B(0,H-8)A(0,H-8)...H(0,H-1)...B(0,H-1)A(0,H-1) |
| H(1,0)...B(1,0)A(1,0)...H(1,7)...B(1,7)A(1,7) | ∘∘∘ | H(1,H-8)...B(1,H-8)A(1,H-8)...H(1,H-1)...B(1,H-1)A(1,H-1) |
| H(W-1,0)...B(W-1,0)A(W-1,0)...H(W-1,7)...B(W-1,7)A(W-1,7) | ∘∘∘ | H(W-1,H-8)...B(W-1,H-8)A(W-1,H-8)...H(W-1,H-1)...B(W-1,H-1)A(W-1,H-1) |
| ZERO_PADD_I(0,0)...ZERO_PADD_I(0,7) | ∘∘∘ | ZERO_PADD_I(0,H-8)...ZERO_PADD_I(0,H-1) |
| ZERO_PADD_I(1,0)...ZERO_PADD_I(1,7) | ∘∘∘ | ZERO_PADD_I(1,H-8)...ZERO_PADD_I(1,H-1) |
| ZERO_PADD_I(0,H-1)...ZERO_PADD_I(W-1,7) | ∘∘∘ | ZERO_PADD_I(W-1,H-8)...ZERO_PADD_I(W-1,H-1) |

| | | | |
|---|---|---|---|
| H(0,0)...B(0,0)A(0,0)... | ...H(0,7)...B(0,7A(0,7)... | ...H(0,H-8)...B(0,H-8)A(0,H-8)...H(0,H-1)...B(0,H-1)A(0,H-1) |
| ZERO_PADD_I(0,0)... | ...ZERO_PADD_I(0,7)... | ...ZERO_PADD_I(0,H-8)...ZERO_PADD_I(0,H-1) |
| H(1,0)...B(1,0)A(1,0)... | ...H(1,7)...B(1,7)A(1,7)... | ...H(1,H-8)...B(1,H-8)A(1,H-8)...H(1,H-1)...B(1,H-1)A(1,H-1) |
| ZERO_PADD_I(1,0)... | ...ZERO_PADD_I(1,7)... | ...ZERO_PADD_I(1,H-8)...ZERO_PADD_I(1,H-1) |
| ∘∘ | ∘∘ | ∘∘ |
| H(W-1,0)...B(W-1,0)A(W-1,0)... | ...H(W-1,7)...B(W-1,7)A(W-1,7)... | ...H(W-1,H-8)...B(W-1,H-8)A(W-1,H-8)...H(W-1,H-1)...B(W-1,H-1)A(W-1,H-1) |
| ZERO_PADD_I(W-1,0)... | ...ZERO_PADD_I(W-1,7)... | ...ZERO_PADD_I(W-1,H-8)...ZERO_PADD_I(W-1,H-1) |

↙ 960

METHOD AND CIRCUITRY FOR PERFORMING CENSUS TRANSFORMS

CROSS-REFERENCE TO RELATED APPLICATION

This application claims priority to U.S. Provisional Patent Application Ser. No. 62/115,211, filed Feb. 12, 2015, entitled VECTORIZED METHOD TO CALCULATE CENSUS TRANSFORM ON A SIMD PROGRAMMABLE PROCESSOR, naming Victor Cheng and Darnell Moore as inventors, which is hereby fully incorporated herein by reference for all purposes.

BACKGROUND

A census transform is an image transform that computes, for each pixel in an image, a feature vector that describes the relative intensity changes around that pixel in a very compact way. Census transform is very robust against illumination changes making it useful for the kind of feature matching used in stereovision or optical flows.

SUMMARY

A method of stitching data generated by a plurality of census transforms includes performing a plurality of census transforms on an array of pixels in a first direction. A first portion of the results of the plurality of census transforms are stored in a first array as at least one first code word. A second array is generated by transposing the horizontal and vertical locations of the code words of the first array. A second portion of the results of the plurality of census transforms is stored in a third array as at least one second code word. A fourth array is generated by transposing the horizontal and vertical locations of the code words of the third array. A fifth array is generated by interleaving the at least one first code word of the second array and the at least one second code word of the fourth array. A first code word is stitched to a second code word in the fifth array, wherein the first and second code words are located adjacent each other in a vertical column of the fifth array.

BRIEF DESCRIPTION OF THE DRAWINGS

FIG. 1 is an example array of pixel locations in an image.

FIG. 2 is an orientation mask for a 3×3 census transform.

FIG. 4 is an array showing the resulting orientation function I_A(x,y) for the array of FIG. 1.

FIG. 6 is a diagram of a plurality of mathematical expressions for generating eight orientation masks from eight horizontal positions of the array of FIG. 1.

FIG. 9A is an array describing the coding of the orientation masks of FIG. 7C into eight 8-bit code words by way of the flow chart of FIG. 8.

FIG. 9B is an array showing the results of transposing the code words of the array of FIG. 9A.

FIG. 9E is an array showing the code words of FIG. 9D transposed wherein the x and y locations are switched.

FIG. 9F is an array showing the array of FIG. 9E with the zero_padd code words interlaced with the A_H(y,x) code words.

DETAILED DESCRIPTION

Census transforms are an increasingly popular image processing transforms that are used in stereo-vision and optical flow. A census transform is an image transform that computes a feature vector for each pixel in an image that describes the relative intensity changes around each pixel in an image. The transform offers robustness against illumination changes, which makes it a good transform for the kind of feature matching used in stereovision and optical flow. However, census transform is quite computational intensive and usually is implemented on a field-programmable gate array (FPGA). The following disclosure describes methods for implementing census transforms efficiently on a single instruction, multiple data (SIMD) architecture. The methods described herein rearrange the census transform process flow to be more compatible with SIMD architecture.

FIG. 1 is a two-dimensional array 100 of pixel locations in an image. The array 100 consists of pixel values p(x,y) where each value of p(x,y) is the intensity or pixel value at location (x,y). In some examples, the pixel values are 8-bit values.

A census transform generates an orientation mask at a position (x,y). As described below, a plurality of orientation masks are generated for a plurality or all of the pixel locations in the array 100. Reference is made to FIG. 2, which is an orientation mask 200 for a 3×3 census transform. As shown by the orientation mask 200, there are nine orientation functions referred to as A(x,y), B(x,y) . . . I(x,y) in the orientation mask 200. Each orientation function outputs a logic 0 or a logic 1 depending on its pixel value in relation to the value of the center pixel p(x,y), which is collocated with the orientation function E(x,y). For example, if the center pixel value corresponding to p(x,y) is greater or equal to the pixel value at an orientation or location, the orientation function outputs a logic 1. Otherwise, the orientation function outputs a logic 0. The orientation function E(x,y) always produces a logic 1 because the orientation is the center pixel p(x,y) itself.

Figures 3, 5:
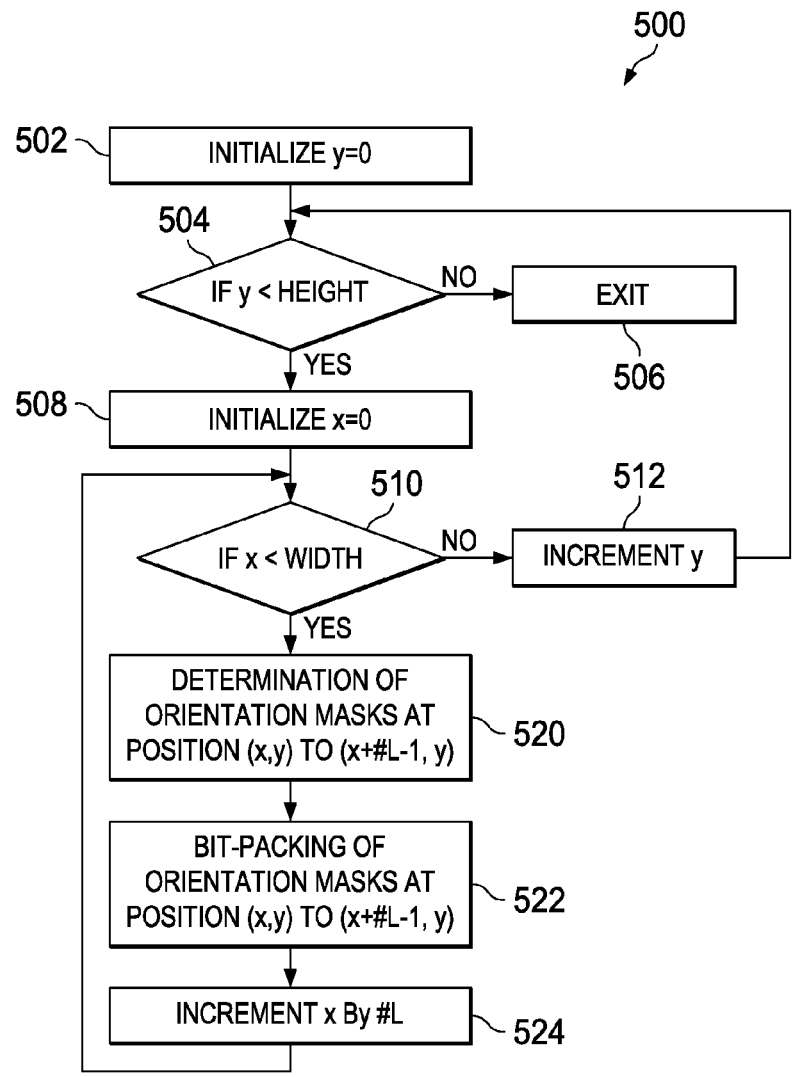
FIG. 3 is an array of mathematical expressions for the orientation mask of FIG. 2 at position (x,y).
FIG. 5 is a flow chart describing the generation of an orientation mask and bit packing on an SIMD processor.

FIG. 3 is an array 300 of orientation functions for the orientation mask 200 at position (x,y). As shown by the orientation functions, the orientation function E(x,y) is always logic 1. As an example of other orientation functions, reference is made to a pixel value p(5,3) in the array 100, which will be the p(x,y) pixel value collocated with the orientation function E(x,y) in the orientation mask 200 and the array 300. The orientation function A(5,3) is a logic 1 if the pixel value p(4,2) is less than the pixel value (5,3). The orientation function B(5,3) is a logic 1 if the pixel value p(5,2) is less than the pixel value p(5,3). In the 3×3 orientation function, the functions are performed for all the pixel values surrounding the center pixel, which in the above example is the pixel at location (5,3). In a 3×3 orientation function, there will be nine calculations performed, which generate nine logic values, which is one for each pixel value or location surrounding the center pixel.

FIG. 4 is an array 400 showing the resulting orientation functions I_A(x,y) for the array 100 of FIG. 1. As described above, each orientation function I_A(x,y) has nine bits generated by the individual orientation functions A(x,y), B(x,y), etc, up to I(x,y) for each pixel value p(x,y). The resulting orientation functions in the array 400 are described as I_A(x,y)=IHGFEDCBA(x,y)=(I(x,y)<<8)|(H(x,y)<<7) . . . |(A(x,y)<<0), which is also referred to as bit-packing the results of the orientation masks.

The implementation of census transforms on a SIMD processor follows steps that include computation of the orientation mask as described above, bit packing of the orientation mask, bit transpose of orientation masks to generate code words, and re-arrangement of the code words. In the following examples, it is assumed that the SIMD processor has #L ways wherein #L is equal to one or eight. The reference #L is the number of lanes in the vector registers of a SIMD architecture. In other words, #L is the number of data points that can be processed in parallel per clock cycle. In a SIMD processor, instead of loading 1 data-point into a register, it is possible to load #L data point in parallel into a vector register and then apply the same operation to these #L data points in parallel. For example, if a register a=[0 1 2 3 4 5 6 7] can be added to a register b=[1 1 1 1 1 1 1 1] in one cycle to produce eight results in register c=[1 2 3 4 5 6 7 8].

FIG. 5 is a flow chart 500 describing the generation of the orientation mask and bit packing in an SIMD processor. The flow chart 500 commences with block 502 where an initialization process is performed to set y equal to zero. Per the array 100 of FIG. 1, the variable y refers to the rows in the array 100 or the height of a pixel within the array 100. Processing continues to decision block 504 where a decision is made as to whether the variable y is less than the height of the array. If not, the array has been analyzed and processing proceeds to step 506 where it is terminated. If the variable y is less than the height of the array, processing proceeds to block 508 where a variable x is initialized to zero. The variable x represents the columns in the array, so the flow chart 500 processes the array across one row at a time. In this regard, decision block 510 determines if the variable x is less than the width of the array. If not, the variable y is incremented at block 512 and processing proceeds to decision block 504.

If the result of decision block 510 is affirmative, processing proceeds to block 520 where the orientation masks are determined. The orientation masks are determined or calculated as described with reference to the orientation functions of FIG. 3. Each time processing proceeds to block 520, orientation masks are generated for positions (x,y) to (x+#L−1,y). Because of the SIMD processing, #L mathematical expressions of an orientation mask are generated in a single clock cycle. Processing proceeds to block 522 where bit-packing of the orientation masks at positions (x,y) to (x+#L−1,y) is performed, which generates a word of #L bits. Processing proceeds to block 524 where the variable x is incremented by #L, then to determination block 510.

When #L is equal to one, the computation of a 3×3 orientation mask is performed per the array 300 of FIG. 3 for one position. With regard to bit packing, the result of the census transform with #L equal to one at one position is the concatenation of the orientation mask into a code word of 8-bits, 16-bits, 32-bits or 64-bits, depending on the size of the census transform. In the example of a 3×3 census transform, nine bits minimum are generated, but it may be rounded up to 16 bits for easy storage in a memory for which the smallest addressable unit is a byte.

FIG. 6 is diagram 600 showing a plurality of orientation functions for generating eight orientation masks 602 from eight horizontal positions in the array 100 of FIG. 1. In the example of FIG. 6, the orientation masks 602 are based on 3×3 census transforms with #L equal to eight positions. As shown in FIG. 6, the eight positions correlate to locations (x,y) to (x+7,y), which is eight positions in a row of the array 100 of FIG. 1.

Figure 7A:
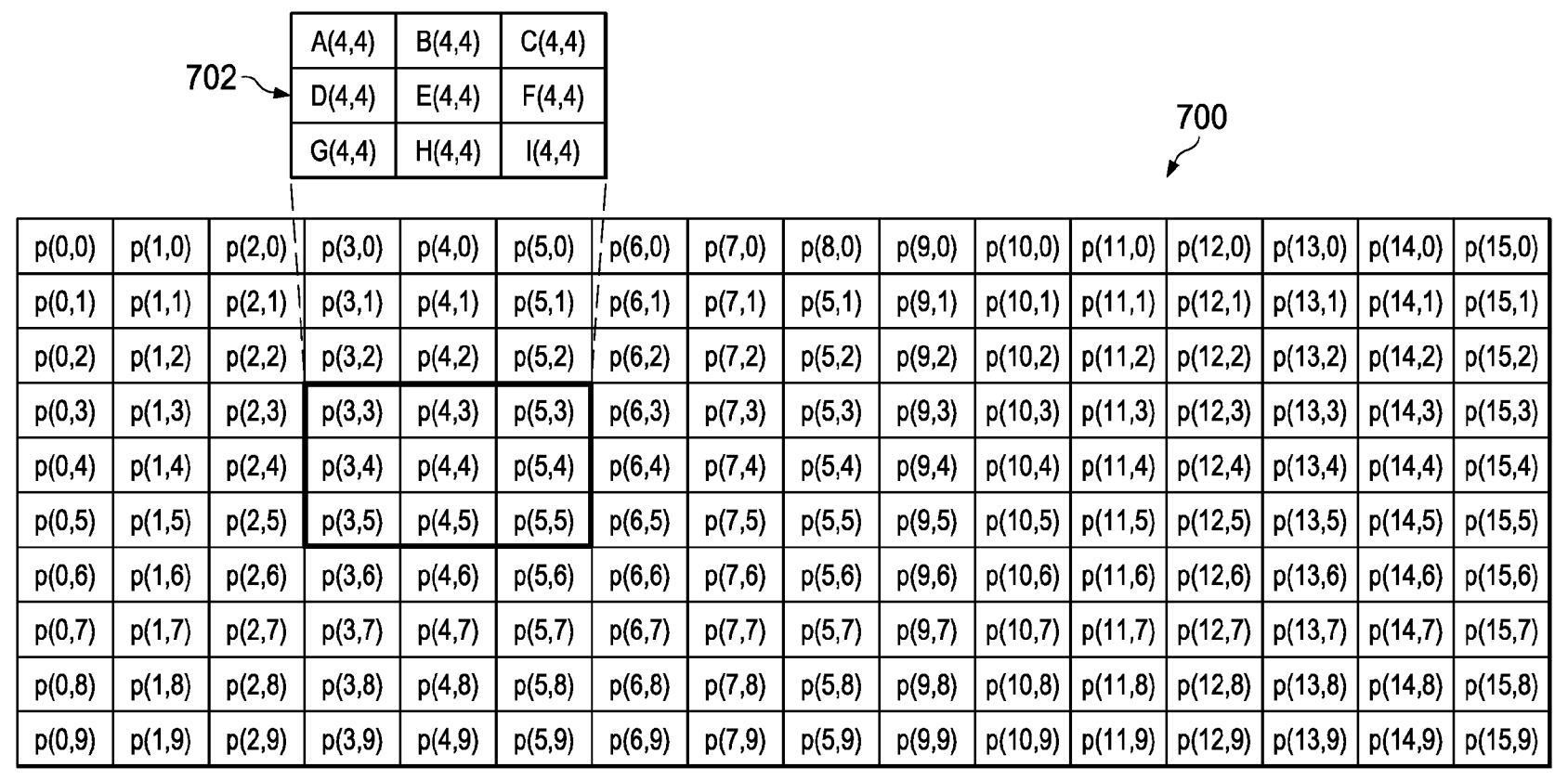
Figure 7B:
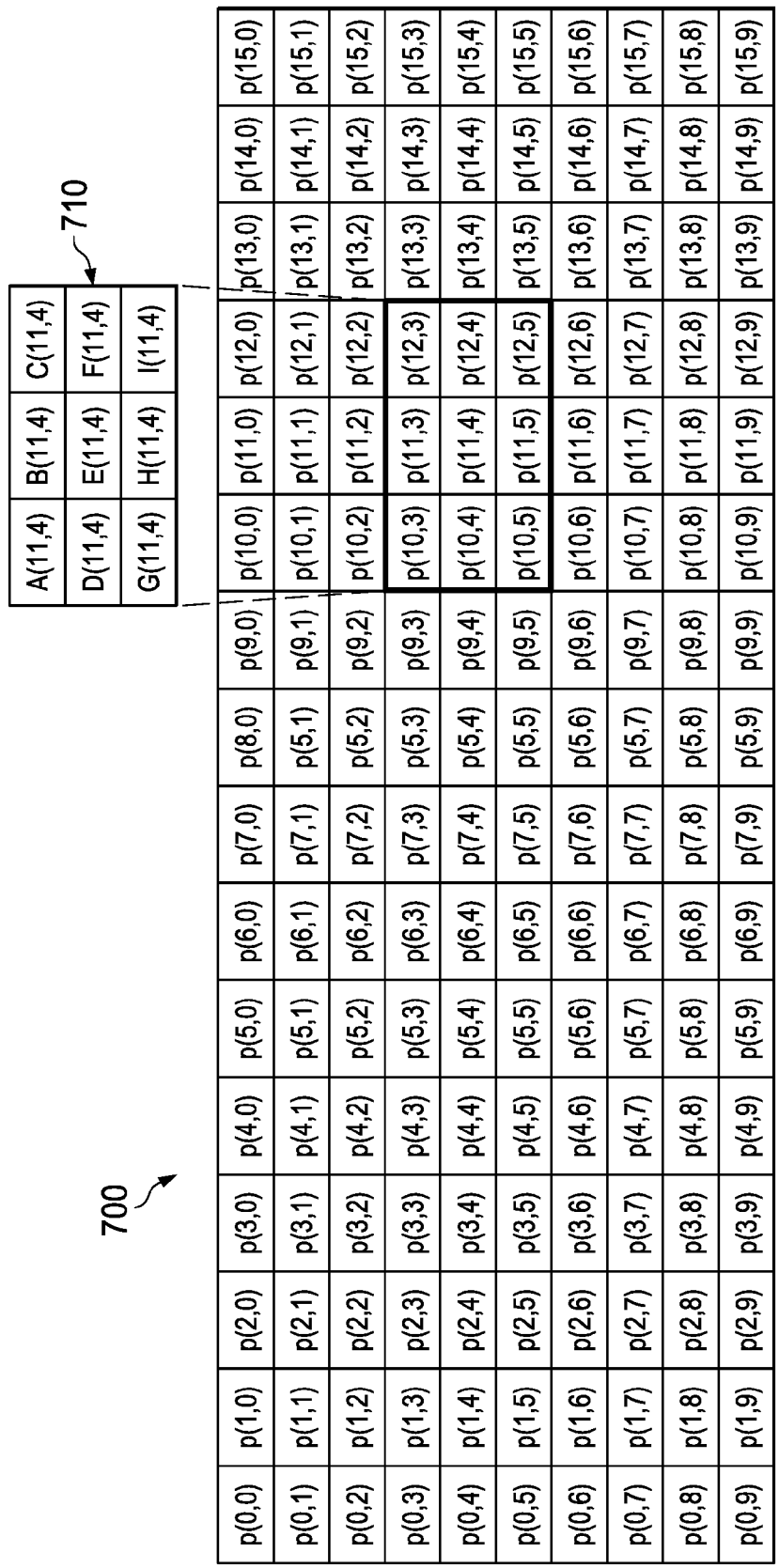
FIG. 7A is a diagram showing the calculation of an orientation mask at location (4,4) from the array of FIG. 1.
FIG. 7D is a diagram showing the calculation of an orientation mask at location (11,4) from the array of FIG. 1.
FIG. 7C is a diagram showing the accumulation of orientation masks generated from a row of eight pixels per FIGS. 7A and 7B.

FIG. 7A is an array 700 showing the calculation of an orientation mask 702 from a single position within the array 700. The orientation mask 702 is calculated at a location (4,4). The array 700 of FIG. 7A provides the initial step in calculating orientation masks at eight locations wherein the orientation mask 702 is calculated at a first location, which in this example is the location (4,4). The orientation mask 702 is calculated as described above by comparing pixel values p(x,y) surrounding the location (4,4) to the pixel value p(4,4). The generation of orientation masks continues across row four until the location (11,4) is reached as shown in FIG. 7B, which is the array 700 showing the calculation of an orientation mask 710 at location (11,4). FIG. 7C is a diagram 720 showing the accumulation of orientation masks generated from a row of eight pixels. With regard to the example described above, the value of both x and y is the starting position (4,4). As noted, there are nine values generated for each orientation mask, but a typical byte is eight bits, so one of the orientation functions will not be coded or bit packed. In the 3×3 orientation masks described herein and shown in FIG. 7C, a cell 722 representing orientation functions I(x,y) through I(x+7,y) are not immediately processed as described below. The result of the processing by the flow chart 500 of FIG. 5 yields the data shown in FIG. 9A, which is an array 900 describing the coding of the orientation masks of FIG. 7C into eight 8-bit registers V[0] to V[7]. All of the orientation masks except for the cell 722 have been coded.

Figure 8:
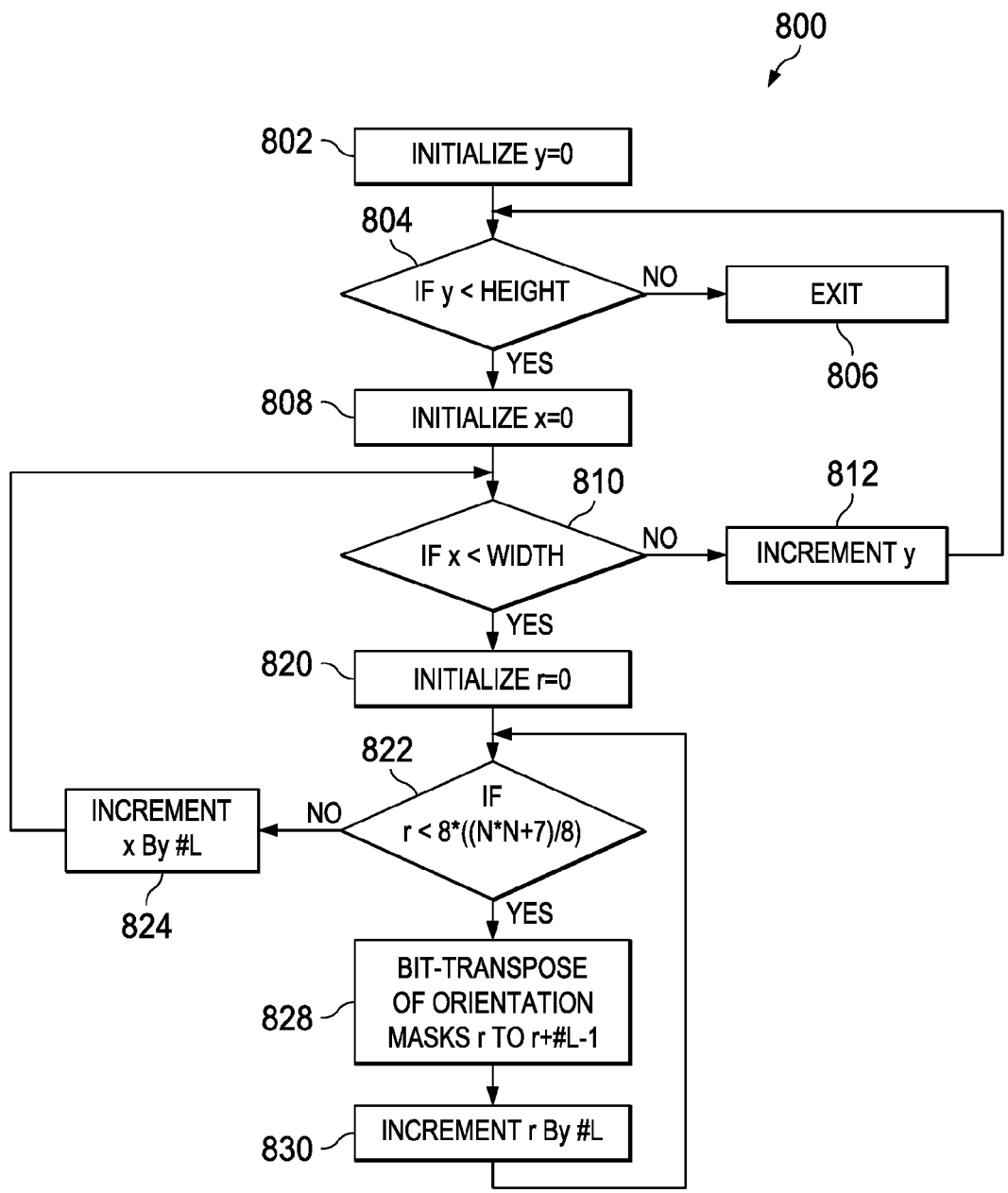
FIG. 8 is a flow chart describing generating code words based on the orientation masks of FIG. 7C.

FIG. 8 is a flow chart 800 describing generating code words based on the orientation masks of FIG. 7C. The result of the processing by the flow chart 800 yields the data shown in FIG. 9B and FIG. 9C, which are arrays 920 and 930 describing the code words generated from the orientation masks of FIG. 7C originally stored into eight 8-bit registers V[0] to V[7]. All of the orientation masks except for the cell 722 have been coded. The flow chart 800 commences at block 802 by initializing the value of y to zero, meaning that the first row of pixel values will be evaluated. With regard to the example of FIG. 7A, the row being analyzed is row 4. Processing proceeds to decision block 804 where a determination is made as to whether the variable y is less than the height of the portion of the array being analyzed. In the example described above, a single row is being evaluated, so the height is one. If the outcome of the decision block 804 is negative, processing proceeds to block 806 and is terminated. If the outcome of decision block 804 is affirmative, processing proceeds to block 808 where the variable x is initialized to zero. The variable x refers to the column being evaluated. Processing then proceeds to decision block 810 to determine if the variable x is less than the width of the portion of the array being analyzed. In the examples described above, the width is eight. If the outcome of decision block 810 is negative, processing proceeds to block 812 to increment the variable y and then to decision block 804.

If the outcome of decision block 810 is affirmative, processing proceeds to block 820 where a variable r is set to zero. The variable r is the number of iterations that will be performed, which is the number of groups or orientation masks that will be generated. Processing from block 820 proceeds to decision block 822 were a decision as to whether the variable r is less than N*N rounded up to the next multiple of 8, which can be expressed in integer arithmetic by 8*(ROUND((N*N+7)/8)), where the values of N are the height and width or dimensions of the orientation masks. In the example where N=3, the decision block 822 checks the variable r against the value 16. If the outcome of the decision block 822 is negative, processing proceeds to block 824 where the variable x is incremented by #L and then to decision block 810. If the outcome of decision block 822 is affirmative, processing proceeds to block 828 where the bits of the orientation mask are transposed for r to r+#L−1. Processing then proceeds to block 830 where the variable r is incremented by #L and then to decision block 822.

FIG. 9A is an array 900 showing the coding of the orientation masks of FIG. 7C into eight 8-bit registers 904, which are the input of block 828 from the flow chart 800 of FIG. 8. As shown in the array 900, eight registers 904 (referenced as V) each correspond to one orientation direction or function. Each of the registers 904 has eight bits for each of the eight orientation masks generated. There is no register holding the I-directions in this iteration. The register for the I-direction will be generated in a second iteration. Eventually, the code words for the I-direction will be added to or stitched to the corresponding H_A(x,y) code words as described below.

Figures 9C, 10:
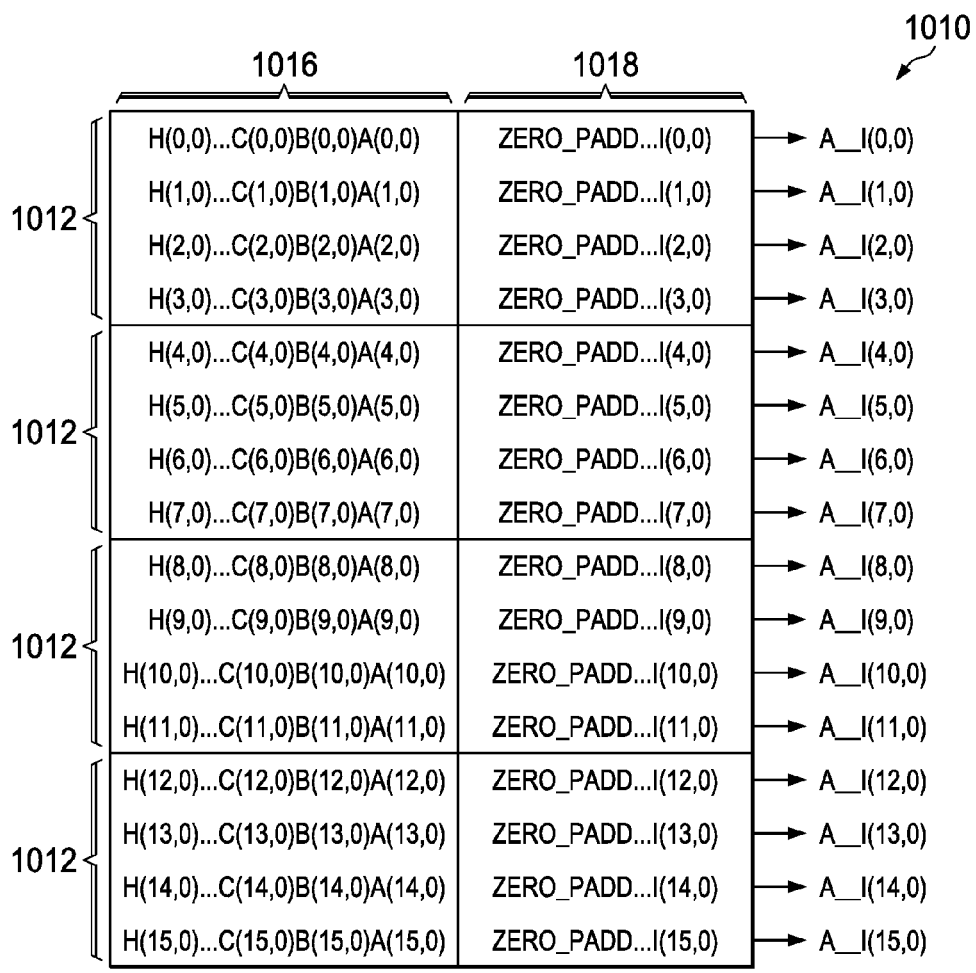
FIG. 9C is an array showing the results of the second iteration and transposing of the code words related to the I-direction of the orientation mask.
FIG. 10 is an array 1010 showing an ideal ordering of the code words of the grid of FIG. 9D.

A column 910 of bits is transposed to the register V[0]. The corresponding bit locations are transposed so that the bits of the registers 904 are the direction vectors of the orientation masks as shown in FIG. 9B, which is an array 920 of the transposed bits. At the end of the first iteration of r, the content of the eight registers V[0] to V[7] is written into memory producing eight partial code words of 8-bits (one 8-bit code word corresponds to the directions A,B,C, D,E,F,G,H) for eight consecutive positions (x,y), (x+1,y), . . . (x+7,y). In a second iteration, the values of I(x,y) to I(x+7,y) are calculated as shown by the array 930 of FIG. 9C, which shows the results of the second iteration and transposing of the I-direction of the registers. As shown in the array 930, the values of I(x,y) to I(x+7,y) are the zero bits of the registers V[0] to V[7]. The remaining bits are 0 logic bits and are filled with zeros, which is referred to as zero_padd. This second iteration produces the remaining eight bits required to complete the code words produced in the first iteration and the content of the eight registers V[0] to V[7] is written into memory producing eight partial codeword of 8-bits (corresponding to orientation I and including zero_padd) for eight consecutive positions (x,y), (x+1,y), . . . (x+7,y).

Figure 9D:
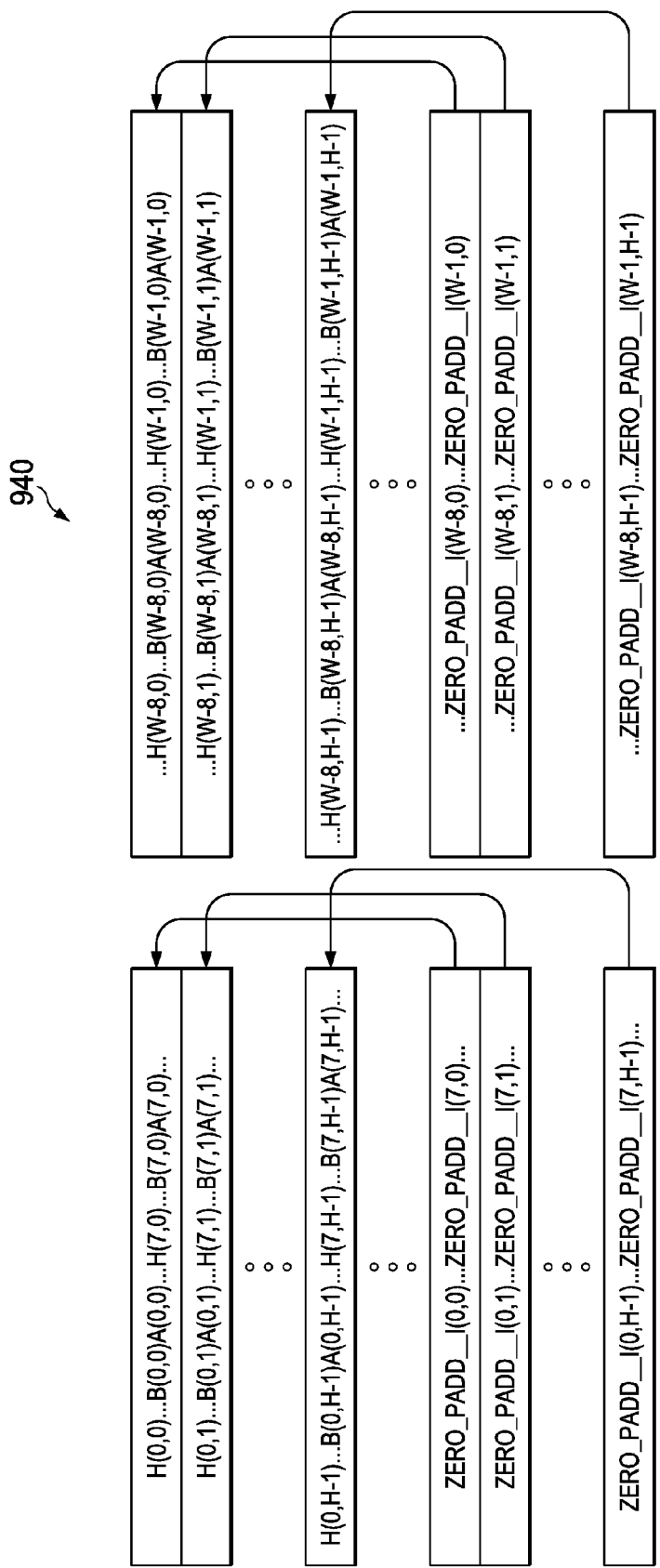
FIG. 9D is a grid showing the arrangement of results from the combination of the arrays of FIGS. 9B and 9C.

The result for an input array of dimension of width W pixels and height H pixels is shown in FIG. 9D, which is a grid 940 showing the arrangement of results from the combination of the grids of FIGS. 9B and 9C. The grid 940 shows the results from the grids 9B and 9C duplicated in an iterative manner in order to cover all the positions present in the input array of dimension of width W pixels and height H pixels. In the example of FIG. 9D, there are groups of #L=8 bytes written per iteration r and each box containing H(x,y) . . . C(x,y)B(x,y)A(x,y), which is one byte and each box containing ZERO_PADD_I(x,y), which is also one byte. As shown in FIG. 9D, the code words corresponding to the I-directions were generated as a separated group by the process described in the flow chart 800. The array 400 of FIG. 4 shows an ideal ordering of the results of FIG. 9D, in which the code words corresponding to I-direction are stitched to the code words H(x,y) . . . C(x,y)B(x,y)A(x,y). In general, SIMD architecture cannot directly generate the ideal ordering directly from the process described in flow chart 800 because eight consecutive bytes are written to memory in the first iteration of 'r' with each byte corresponding to a code word H(x,y) . . . C(x,y)B(x,y)A(x,y) for a given position (x,y). Unless the architecture has the ability to leave gaps while writing out the eight bytes, the second iteration of r can only write out the code words corresponding to the I-direction into a separate group as depicted in FIG. 9D. An extra process referred to as "stitching" is required in order to obtain the ideal ordering.

FIG. 10 is an array 1010 showing an ideal ordering of the results of FIG. 9D. Each of the rows 1012 of the array 1010 is eight bytes per iteration r. Each element in the columns 1016 and 1018 are eight bit code words. When read by row, each combination of a code word from the column 1016 and its corresponding code word from column 1018 is referred to by its A_I(x,y) designation. Referring to FIG. 9D, the stitching of the code words to yield the code words of FIG. 10 is shown by the arrows.

The process of obtaining the grid 1010 of FIG. 10 includes: transposing the locations of the code words of FIG. 9D into a grid 950 of FIG. 9E, moving rows of zero_padd_I (x,y) in an interlaced manner into a grid 960 of FIG. 9F, and then transposing back to obtain the final correct format of FIG. 10. As described above, FIG. 9E is a grid 950 showing the code words of FIG. 9D transposed wherein the x and y locations are switched. Once in a transposed format, as shown in FIG. 9F, the zero_padd_I(x,y) code words are interlaced with the A_H(x,y) code words to form the grid 960 of FIG. 9F. When the grid 960 is read vertically, the A_H(x,y) code words are stitched appropriately next to the zero_padd_I(x,y) code words. After transposing again, the desired output as shown by the grid 1010 of FIG. 10 is obtained.

Figure 11:
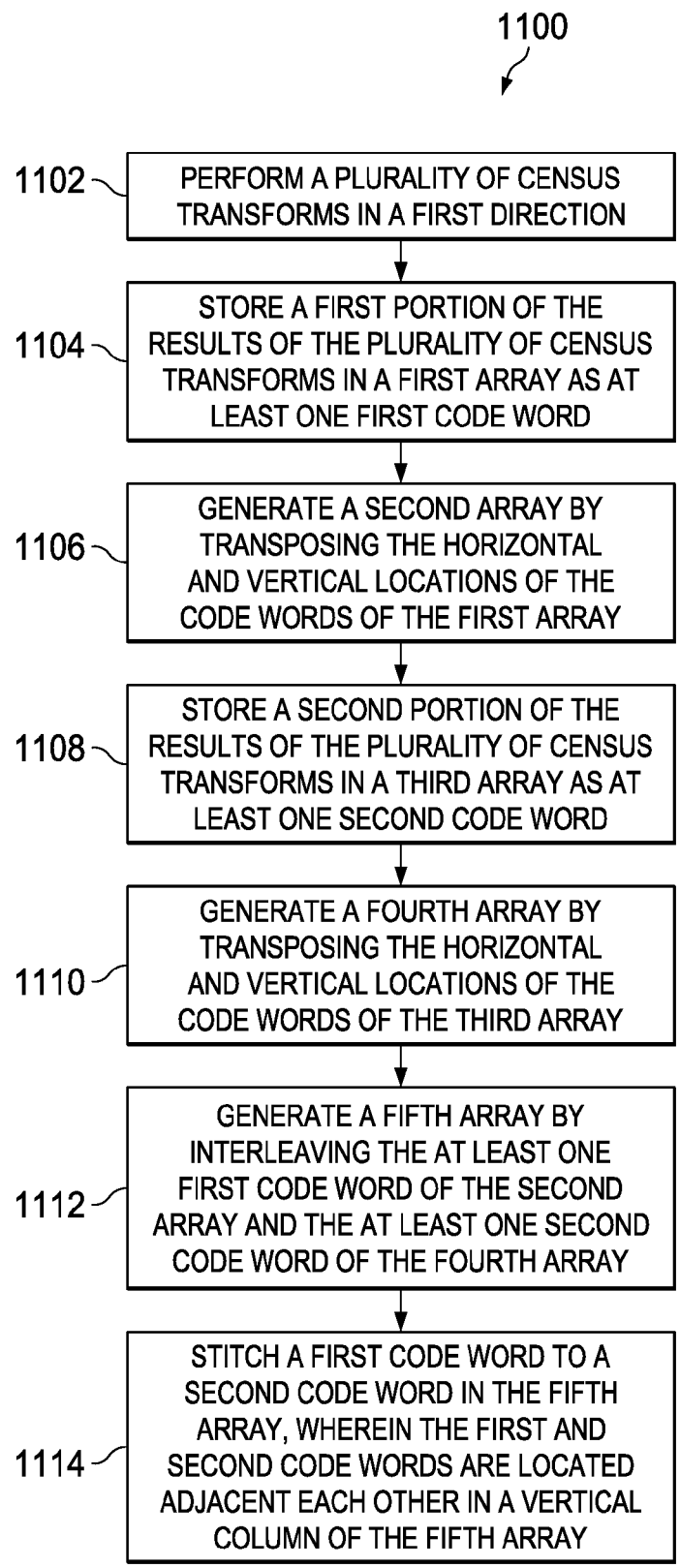
FIG. 11 is a flow chart describing an example of the above-described census transform methods.

FIG. 11 is a flow chart 1100 describing an example of the above-described methods. At step 1102, the method includes performing a plurality of census transforms on an array of pixels in a first direction. At step 1104, the method includes storing a first portion of the results of the plurality of census transforms in a first array as at least one first code word. Step 1106 includes generating a second array by transposing the horizontal and vertical locations of the code words of the first array. Step 1108 includes storing a second portion of the results of the plurality of census transforms in a third array as at least one second code word. Step 1110 includes generating a fourth array by transposing the horizontal and vertical locations of the code words of the third array. Step 1112 includes generating a fifth array by interleaving the at least one first code word of the second array and the at least one second code word of the fourth array. Step 1114 includes stitching a first code word to a second code word in the fifth array, wherein the first and second code words are located adjacent each other in a vertical column of the fifth array.

While some examples of census transforms have been described in detail herein, it is to be understood that the inventive concepts may be otherwise variously embodied and employed and that the appended claims are intended to be construed to include such variations except insofar as limited by the prior art.

What is claimed is:

1. A method of stitching data generated by a plurality of census transforms, the method comprising:
    performing a plurality of census transforms on an array of pixels in a first direction, wherein performing the plurality of census transforms includes simultaneously performing a predetermined number of census functions, and wherein the predetermined number is a number of lanes in vector registers of a single instruction, multiple data SIMD) processor;
    storing a first portion of the results of the plurality of census transforms in a first array as at least one first code word;
    generating a second array by transposing the horizontal and vertical locations of code words of the first array;
    storing a second portion of the results of the plurality of census transforms in a third array as at least one second code word;
    generating a fourth array by transposing the horizontal and vertical locations of code words of the third array;
    generating a fifth array by interleaving at least one first code word of the second array and at least one second code word of the fourth array; and
    stitching a first code word in the fifth array to a second code word in the fifth array, wherein the first and second code words in the fifth array are located adjacent each other in a vertical column of the fifth array.

2. The method of claim 1, wherein performing a plurality of census transforms in a first direction includes performing a multiple of eight census transforms simultaneously in the first direction.

3. The method of claim 2, wherein the plurality of census transforms are performed over a plurality of iterations.

4. The method of claim 3, wherein the number of iterations is the number of directions in the census transform.

5. The method of claim 1, wherein simultaneously performing the predetermined number of census functions includes simultaneously performing the predetermined number of census functions on a plurality of pixel values.

6. The method of claim 1, wherein the method is performed in the SIMD processor.

7. The method of claim 6, wherein the SIMD processor has a multiple of eight lanes in the vector registers of the SIMD processor.

8. The method of claim 1, wherein performing a plurality of census transforms comprises performing a plurality of three by three census transforms.

9. The method of claim 1, wherein performing a plurality of census transforms comprises simultaneously performing at least one orientation function in all of the plurality of census transforms.

10. A method of stitching data generated by a plurality of census transforms, the method comprising:
    performing a plurality of census transforms in a first direction, the performing including simultaneously performing orientation functions in a plurality of the census transforms and simultaneously performing a predetermined number of census functions, wherein the predetermined number is a number of lanes in vector registers of a single instruction, multiple data (SIMD) processor;
    storing the results of the plurality of census transforms in a first array as at least a first code word and a second code word for each of the plurality of census transforms;
    generating a second array by transposing the horizontal and vertical locations of code words of the first array;
    generating a third array by interleaving at least one first code word and at least one second code word in the vertical direction of the second array; and
    stitching a first code word in the third array to a second code word in the third array, wherein the first and second code words in the third array are located adjacent each other in a vertical column.

11. The method of claim 10, wherein performing the plurality of census transforms in the first direction includes simultaneously performing orientation functions in the same direction in a plurality of the census transforms.

12. The method of claim 11, wherein the plurality of census transforms are performed over a plurality of iterations with one iteration per direction.

13. The method of claim 11, wherein the method is performed in the SIMD processor.

14. The method of claim 13, wherein the SIMD processor has a multiple of eight lanes in the vector registers of the SIMD processor.

15. The method of claim 11, wherein performing the plurality of census transforms comprises performing a plurality of three by three census transforms.

16. A method of stitching data generated by a plurality of census transforms using a single instruction, multiple data (SIMD) processor, the method comprising:
    performing a plurality of census transforms in a first direction, the performing including simultaneously performing orientation functions in a plurality of the census transforms, the number of census transforms being the number of lanes in the vector registers of the SIMD processor;
    storing the results of the plurality of census transforms in a first array as at least a first code word and a second code word for each of the plurality of census transforms;
    generating a second array by transposing the horizontal and vertical locations of the code words of the first array;
    generating a third array interleaving at least one first code word and at least one second code word in the vertical direction of the second array; and
    stitching a first code word in the third array to a second code word in the third array, wherein the first and second code words in the third array are located adjacent each other in a vertical column.

17. The method of claim 16, wherein the number of lanes is a multiple of eight.

18. The method of claim 16, wherein performing a plurality of census transforms in a first direction includes simultaneously performing orientation functions in the same direction in a plurality of the census transforms.

* * * * *